United States Patent
Lyle et al.

(10) Patent No.: US 11,925,144 B2
(45) Date of Patent: Mar. 12, 2024

(54) MOWER CONDITIONER IMPELLER HOOD ACTUATING MECHANISM

(71) Applicant: DEERE & COMPANY, Moline, IL (US)

(72) Inventors: Zachary J. Lyle, Keota, IA (US); Thomas A. Nichols, Eldon, IA (US)

(73) Assignee: DEERE & COMPANY, Moline, IL (US)

( * ) Notice: Subject to any disclaimer, the term of this patent is extended or adjusted under 35 U.S.C. 154(b) by 505 days.

(21) Appl. No.: 17/155,146

(22) Filed: Jan. 22, 2021

(65) Prior Publication Data

US 2022/0232776 A1    Jul. 28, 2022

(51) Int. Cl.
| | |
|---|---|
| A01D 57/26 | (2006.01) |
| A01D 34/66 | (2006.01) |
| A01D 41/06 | (2006.01) |
| A01D 43/10 | (2006.01) |

(Continued)

(52) U.S. Cl.
CPC .......... *A01D 82/00* (2013.01); *A01D 34/667* (2013.01); *A01D 41/06* (2013.01); *A01D 43/10* (2013.01); *A01D 43/102* (2013.01); *A01D 57/24* (2013.01); *A01D 57/26* (2013.01)

(58) Field of Classification Search
CPC .... A01D 34/667; A01D 43/10; A01D 43/102; A01D 57/26; A01D 82/00
See application file for complete search history.

(56) References Cited

U.S. PATENT DOCUMENTS 3,699,755 A * 10/1972 Hauser ................. A01D 43/102
                                                          56/DIG. 1
4,233,803 A * 11/1980 Davis .................... A01D 43/102
                                                          56/294

(Continued)

FOREIGN PATENT DOCUMENTS

EP        0064114 A1 * 11/1982
EP        0064115 B1 * 12/1984

(Continued)

OTHER PUBLICATIONS

Extended European Search Report and Written Opinion issued in European Patent Application No. 22151478.9, dated Jun. 17, 2022, in 11 pages.

*Primary Examiner* — Adam J Behrens
*Assistant Examiner* — Madeline I Runco (57) ABSTRACT

A harvesting apparatus includes a crop conditioning element coupled to a frame, and a hood moveable relative to the crop conditioning element. An actuating system moveably connects the hood to the frame. The actuating system includes a driven lever arm rotatably attached to the frame and including a first lever connection and a second lever connection positioned opposite each other across a lever rotation axis. A first pivot assembly is rotatably attached to the frame and includes a first pivot connection coupled to the first lever connection of the driven lever arm, and a second pivot connection coupled to a first lift connection of the hood. A second pivot assembly is rotatably attached to the frame and includes a third pivot connection coupled to the second lever connection of the driven lever arm, and a fourth pivot connection coupled to a second lift connection of the hood.

25 Claims, 5 Drawing Sheets

(51) Int. Cl.
*A01D 57/24* (2006.01)
*A01D 82/00* (2006.01)

(56) References Cited

U.S. PATENT DOCUMENTS

| | | | | |
|---|---|---|---|---|
| 4,539,798 A | * | 9/1985 | Klinner | A01F 12/18 56/364 |
| 4,720,962 A | * | 1/1988 | Klinner | A01D 89/008 56/DIG. 15 |
| 4,799,352 A | * | 1/1989 | Amstutz | A01D 82/00 56/364 |
| 5,966,913 A | * | 10/1999 | Neuerburg | A01D 43/102 56/16.4 R |
| 2007/0068130 A1 | | 3/2007 | Wilhelm | |
| 2008/0120956 A1 | * | 5/2008 | Gradoz | A01D 82/00 56/157 |
| 2020/0029503 A1 | * | 1/2020 | Nielsen | A01D 82/00 |
| 2020/0375112 A1 | * | 12/2020 | Nichols | A01D 57/26 |

FOREIGN PATENT DOCUMENTS

| | | | | |
|---|---|---|---|---|
| EP | 0965260 A1 | | 12/1999 | |
| EP | 3744168 A2 | | 12/2020 | |
| GB | 2169182 A | * | 7/1986 | A01D 43/102 |

\* cited by examiner

MOWER CONDITIONER IMPELLER HOOD ACTUATING MECHANISM

TECHNICAL FIELD

The disclosure generally relates to a harvesting apparatus for an agricultural machine, and more particularly to a crop conditioning system for the harvesting apparatus.

BACKGROUND

A harvesting apparatus may be coupled to an agricultural machine, and may be used to cut and condition crop material, such as but not limited to hay and forage. The harvesting apparatus may be attached to a forward end of the agricultural machine, such as a self-propelled windrower, which pushes the harvesting apparatus. In other embodiments, the harvesting apparatus may be attached to a rearward end of the agricultural machine, such as a tractor, which pulls the harvesting apparatus.

The harvesting apparatus includes a crop conditioning system that conditions the cut crop material. As used herein, "crop conditioning" or "conditioned crop material" includes processing the cut crop material to bend, crimp, and/or crack open stem and stalk portions of the cut crop material, and at least partially remove a wax material from the cut crop material, for the purpose of releasing moisture from the cut crop material and reducing dry-down time of the crop material. Once the crop conditioning system has conditioned the cut crop material, a swathboard at least partially forms the crop material into a swath having a desired width and/or depth.

One configuration of the crop conditioning system includes a crop conditioning element, often referred to as an impeller, that cooperates with a hood. The crop material passes through a gap formed between the hood and the impeller. The amount of crop conditioning and/or the volume of crop material that may be conditioned per unit time is dependent upon the size or width of the gap. An increase in the gap decreases the amount of crop conditioning and/or increases the amount of crop material that may be conditioned during a given time period, whereas a decrease in the gap increases the amount of crop conditioning and/or decreases the amount of crop material that may be conditioned during a given time period.

The hood may be moveable relative to the frame to adjust the gap setting. In a standard or typical crop conditioning system, the hood may be pivotably mounted to a support near a rearward end of the hood, for rotation about a hood rotation axis. A forward end of the hood is raised or lowered to adjust the gap setting. This configuration causes the hood to rotate about the hood rotation axis. This rotational movement causes the forward end of the hood to move upward and forward relative to the impeller, thereby changing not only the gap setting, but also the orientation of the hood relative to the impeller. For example, the location of the narrowest portion of the gap, i.e., the pinch point, may change relative to the impeller, and/or the entrance angle or feed angle into the gap formed between a leading edge of the hood and a horizontal axis may change. These changes in the orientation of the hood relative to the impeller caused by adjusting the gap setting affects the performance of the crop conditioning system.

SUMMARY

A harvesting apparatus for an agricultural machine is provided. The harvesting apparatus includes a frame and a cutting mechanism coupled to the frame. The cutting mechanism is operable to cut crop material. The harvesting apparatus further includes a crop conditioning system. The crop conditioning system includes a crop conditioning element coupled to the frame, and a hood moveable relative to the crop conditioning element. The hood includes a first lift connection and a second lift connection. An actuating system moveably connects the hood to the frame. The actuating system includes a driven lever arm rotatably attached to the frame for rotation about a lever rotation axis. The driven lever arm includes a first lever connection and a second lever connection positioned opposite each other across the lever rotation axis. A first pivot assembly is rotatably attached to the frame for rotation about a first pivot axis. The first pivot assembly includes a first pivot connection coupled to the first lever connection of the driven lever arm, and a second pivot connection coupled to the first lift connection of the hood. A second pivot assembly is rotatably attached to the frame for rotation about a second pivot axis. The second pivot assembly includes a third pivot connection coupled to the second lever connection of the driven lever arm, and a fourth pivot connection coupled to the second lift connection of the hood.

In one aspect of the disclosure, the first lever connection and the first pivot connection are positioned relative to the lever rotation axis and the first pivot axis respectively such that rotation of the driven lever arm in a first rotational direction rotates the first pivot assembly in the first rotational direction, and rotation of the driven lever arm in a second rotational direction rotates the first pivot assembly in the second rotational direction. In another aspect of the disclosure, the second lever connection and the third pivot connection are positioned relative to the lever rotation axis and the second pivot axis respectively such that rotation of the driven lever arm in the first rotational direction rotates the second pivot assembly in the second rotational direction, and rotation of the driven lever arm in the second rotational direction rotates the second pivot assembly in the first rotational direction.

In one aspect of the disclosure, rotation of the first pivot assembly about the first pivot axis in the first rotational direction and rotation of the second pivot assembly about the second pivot axis in the second rotational direction moves the hood away from the crop conditioning element. In contrast, rotation of the first pivot assembly about the first pivot axis in the second rotational direction and rotation of the second pivot assembly about the second pivot axis in the first rotational direction moves the hood toward the crop condition element.

In one aspect of the disclosure, the second pivot connection is positioned relative to the first pivot axis and the first pivot connection to travel in a substantially upward vertical direction in response to rotation of the first pivot assembly in the first rotational direction, and travel in a substantially downward vertical direction in response to rotation of the first pivot assembly in a second rotational direction. In contrast, the fourth pivot connection is positioned relative to the second pivot axis and the third pivot connection to travel in a substantially upward vertical direction in response to rotation of the second pivot assembly in the second rotational direction, and travel in a substantially downward vertical direction in response to rotation of the second pivot assembly in the first rotational direction.

In one aspect of the disclosure, a first link interconnects the first lever connection of the driven lever arm and the first pivot connection of the first pivot assembly. A second link interconnects the second lever connection of the driven lever arm and the third pivot connection of the second pivot assembly. A third link interconnects the second pivot connection of the first pivot assembly and the first lift connection of the hood. A fourth link interconnects the fourth pivot connection of the second pivot assembly and the second lift connection of the hood.

In one aspect of the disclosure, the first lift connection may be positioned along a central longitudinal axis of the frame at a location that is forward of the second lift connection relative to a direction of forward travel when cutting the crop material. In another aspect of the disclosure, the first pivot assembly may be positioned along the central longitudinal axis of the frame forward of the second pivot assembly relative to the direction of forward travel.

In one aspect of the disclosure, a bar interconnects the hood and the frame. The bar is attached to the hood at a first bar mount, and is attached to the frame at a second bar mount. The first bar mount may be positioned along the central longitudinal axis of the frame forward of the second bar mount relative to the direction of forward travel. Additionally, the first bar mount may be positioned along the central longitudinal axis of the frame forward of the first lift connection relative to the direction of forward travel.

In one aspect of the disclosure, the actuating system includes an actuator that is coupled to the driven lever arm. The actuator is operable to rotate the driven lever arm in at least one of a first rotational direction, e.g., clockwise, or a second rotational direction, e.g., counterclockwise. In one implementation, a drive shaft interconnects the actuator and the driven lever arm. The drive shaft is operable to transmit torque between the actuator and the driven lever arm.

In one aspect of the disclosure, the lever rotation axis, the first pivot axis, and the second pivot axis are parallel with each other and extend perpendicular to the central longitudinal axis of the frame, across a width of the frame.

Accordingly, the actuating system described herein moves the hood relative to the crop conditioning element with minimal change to the orientation of the hood relative to the crop conditioning element. As such, the gap setting between the hood and the crop conditioning element may be adjusted without significantly changing the pinch point location between the hood and the crop conditioning element, or without significantly changing the entrance angle into the gap.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Referring to the Figures, wherein like numerals indicate corresponding parts throughout the several views, a harvesting apparatus is generally shown at 20. The exemplary embodiment of the harvesting apparatus 20 shown in the Figures is configured for mounting to a forward end of an agricultural machine, such as a self-propelled windrower. However, it should be appreciated that the teachings of this disclosure may be applied to other platforms, such as but not limited to, the harvesting apparatus 20 being configured for connection to a conventional tractor, i.e., the harvesting apparatus 20 being a mower-conditioner drawn behind the tractor.

The harvesting apparatus 20 is operable to mow and gather standing crop material in a field, condition the cut crop material as it moves through the harvesting apparatus 20 to improve is drying characteristics, and then return the conditioned, cut crop material to the field in a windrow or swath.

Figure 1:
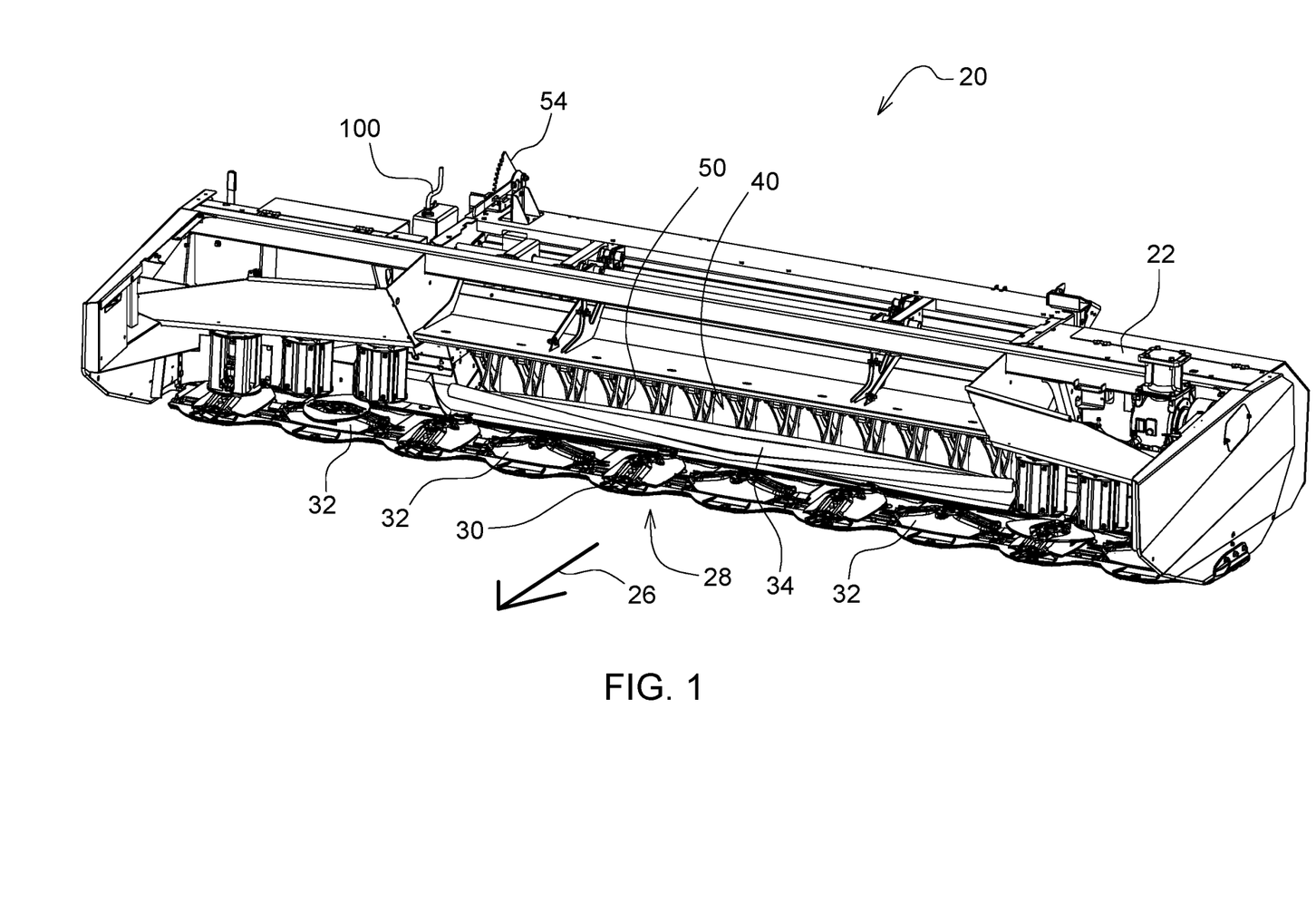
FIG. 1 is a schematic perspective view of a harvesting apparatus.
Figure 2:
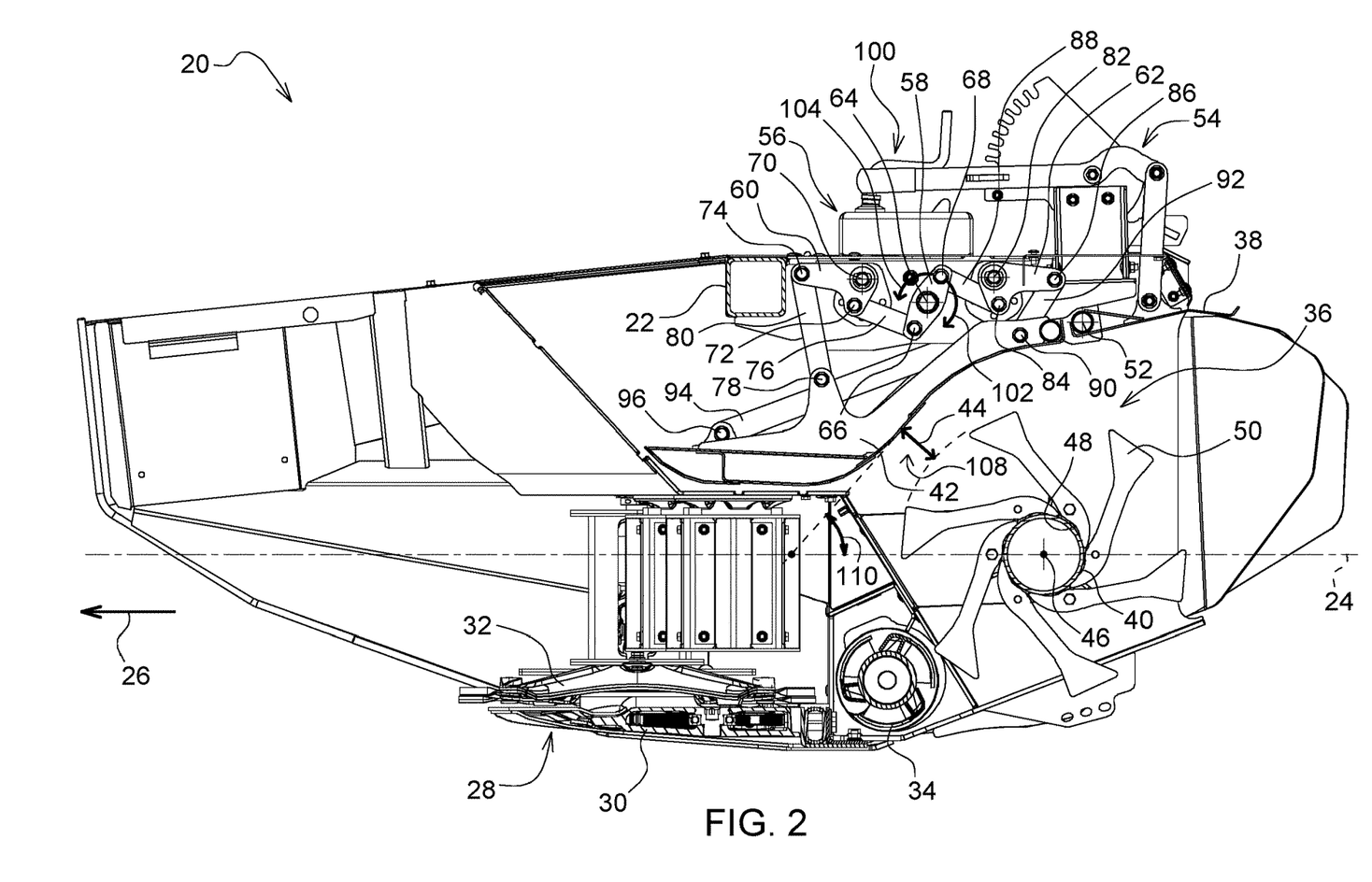
FIG. 2 is a schematic cross sectional view of the harvesting apparatus.
Figure 3:
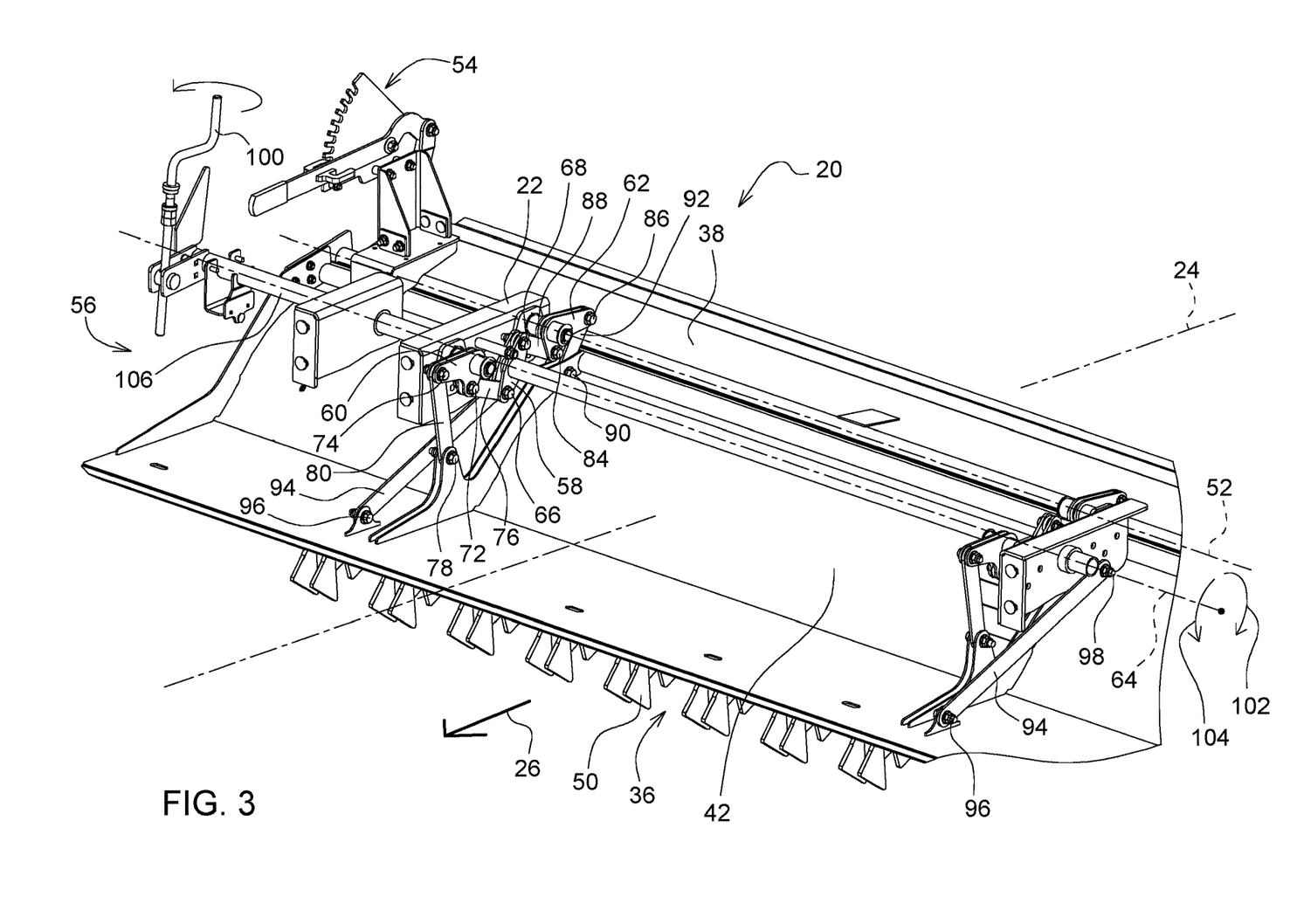
FIG. 3 is a schematic perspective view of an actuating system of the harvesting apparatus from a forward viewing angle.
Figure 4:
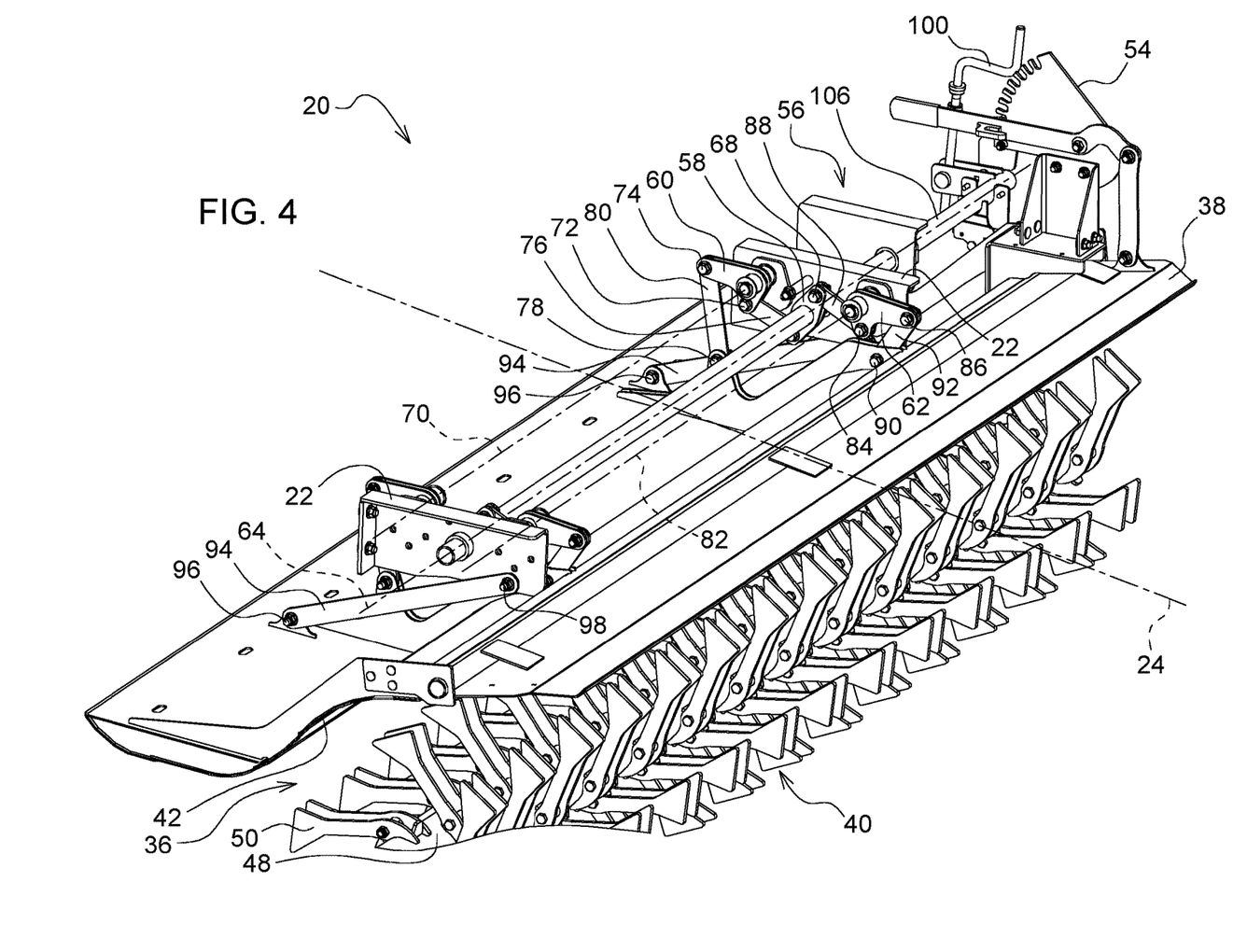
FIG. 4 is a schematic perspective view of the actuating system from a rearward viewing angle.

Referring to FIGS. 1-2, the harvesting apparatus 20 includes a frame 22. The frame 22 may include, but is not limited to, the various members, panels, supports, braces, beams, brackets, etc., necessary to support the various components and systems of the harvesting apparatus 20 as described below. The frame 22 extends along a central longitudinal axis 24, which generally corresponds to and is parallel with a direction of forward travel 26 of the harvesting apparatus 20 when cutting crop material. In one embodiment, the frame 22 may be attached to a forward end of the agricultural machine. In other embodiments, the frame 22 may be attached to the agricultural machine with a drawbar and drawn behind the agricultural machine.

The harvesting apparatus 20 further includes a cutting mechanism 28. The cutting mechanism 28 is coupled to the frame 22, and is operable to cut standing crop material in a field. The cutting mechanism 28 may include any mechanism that is capable of cutting the crop material. As shown in the Figures, the cutting mechanism 28 is embodied as a rotary disc cutter bar 30. However, the cutting mechanism 28 is not limited to the exemplary embodiment of the rotary disc cutter bar 30. As such, it should be appreciated that the cutting mechanism 28 may vary from the exemplary embodiment shown in the Figures and described herein.

The exemplary embodiment of the cutting mechanism 28 includes a cutter bar 30 supported by the frame 22. The cutter bar 30 extends along an axis that is disposed generally transverse to the direction of forward travel 26 of the harvesting apparatus 20 when cutting the crop material. The cutter bar 30 includes a plurality of cutting discs 32 spaced along the cutter bar 30 for rotation about respective vertical axes. Each of the cutting discs 32 is coupled to an upright drive shaft to which power is coupled for causing them to rotate in appropriate directions, for delivering cut crop material to an auger 34 disposed rearward of the cutting mechanism 28.

The auger 34 is rotatably mounted to the frame 22, and passes in front of a crop conditioning system 36. In particular, the auger 34 is positioned in front of and lower than the crop conditioning system 36. The auger 34 includes a central cylindrical drum with a central portion and outer ends. The outer ends of the auger 34 include flighting, and a plurality of fins is attached to the central portion. In operation, the design of the auger 34 enables the delivery of cut crop material into the crop conditioning system 36.

The cutting mechanism 28 delivers cut crop material to the auger 34, which in turn delivers the cut crop material rearward for further processing by the crop conditioning system 36. The conditioned crop material is expelled rearward by the crop conditioning system 36, and is formed into a windrow or swath by upright right and left forming panels (not shown) and a swathboard 38.

Referring to FIG. 2, the crop conditioning system 36 includes a crop conditioning element 40 and a hood 42 associated therewith. The hood 42 is disposed above the crop conditioning element 40 to form a gap 44 therebetween. The crop conditioning element 40 is coupled to the frame 22, and is positioned relative to the frame 22 at a location rearward of the cutting mechanism 28, relative to the direction of forward travel 26 of the harvesting apparatus 20, for receiving cut crop material from the cutting mechanism 28. As shown in the exemplary embodiment, the crop conditioning element 40 is embodied as a crop conditioning impeller. However, it should be appreciated that the crop conditioning element 40 may be embodied as some other device, such as abut not limited to a crop conditioning roll. The crop conditioning element 40 is rotatably driven in a clockwise direction, as viewed on the page of FIGS. 2 and 5-6, about an impeller axis 46. In the exemplary embodiment shown in the Figures and described herein, the crop conditioning element 40 (e.g., the impeller shown in the Figures) may be formed as an elongated cylindrical drum 48 having a plurality of tines 50 or arms coupled to the drum at a radial distance from the impeller axis 46. In the exemplary embodiment shown in the Figures and described herein, each of the plurality of tines 50 is disposed substantially tangentially with respect to the cylindrical drum 48.

The crop conditioning element 40 may be coupled to the harvesting apparatus 20 rearward and upward relative to the auger 34. The crop conditioning element 40 is rotatably driven such that the cut crop material is received from the auger 34, and directed around the crop conditioning element 40, between the hood 42 and the crop conditioning element 40, thereby conveying and/or conditioning the crop. As noted above, the terms "crop conditioning" or "conditioned crop material" include the processing of cut crop material to bend, crimp, and/or crack open stem and stalk portions of the cut crop material, and at least partially remove a wax material from the cut crop material, for the purpose of releasing moisture from the cut crop material and reducing dry-down time of the crop material.

Figure 5:
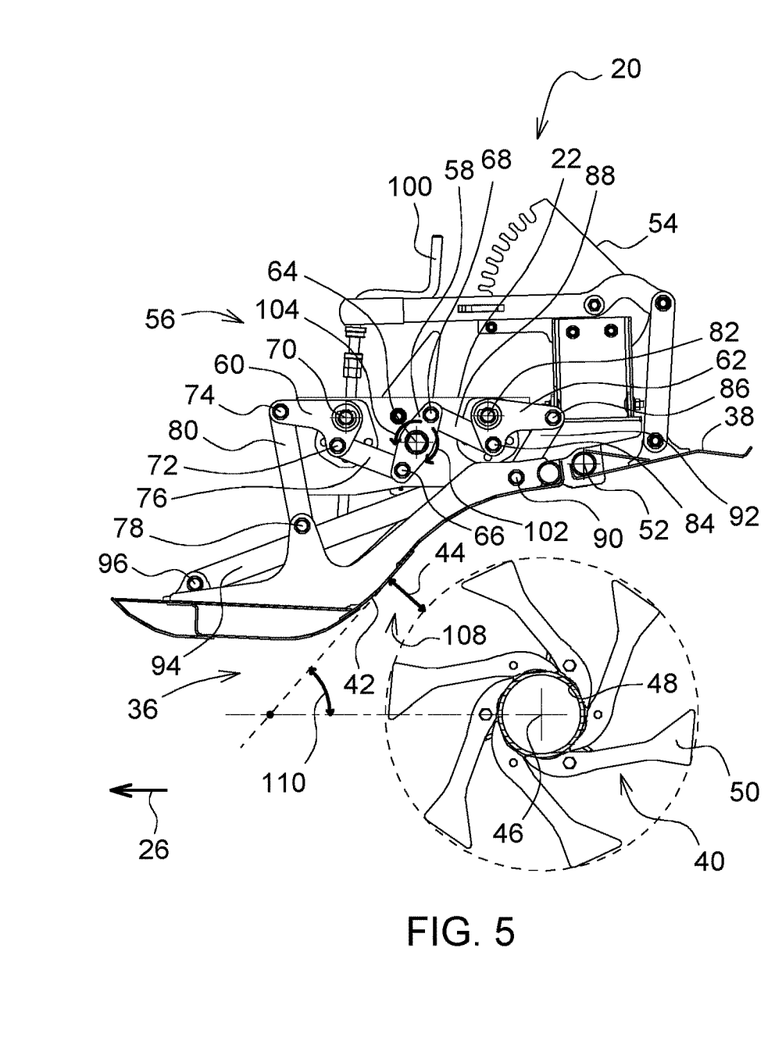
FIG. 5 is a schematic side cross sectional view of the harvesting apparatus showing a hood in a first position (raised) relative to a crop conditioning element.
Figure 6:
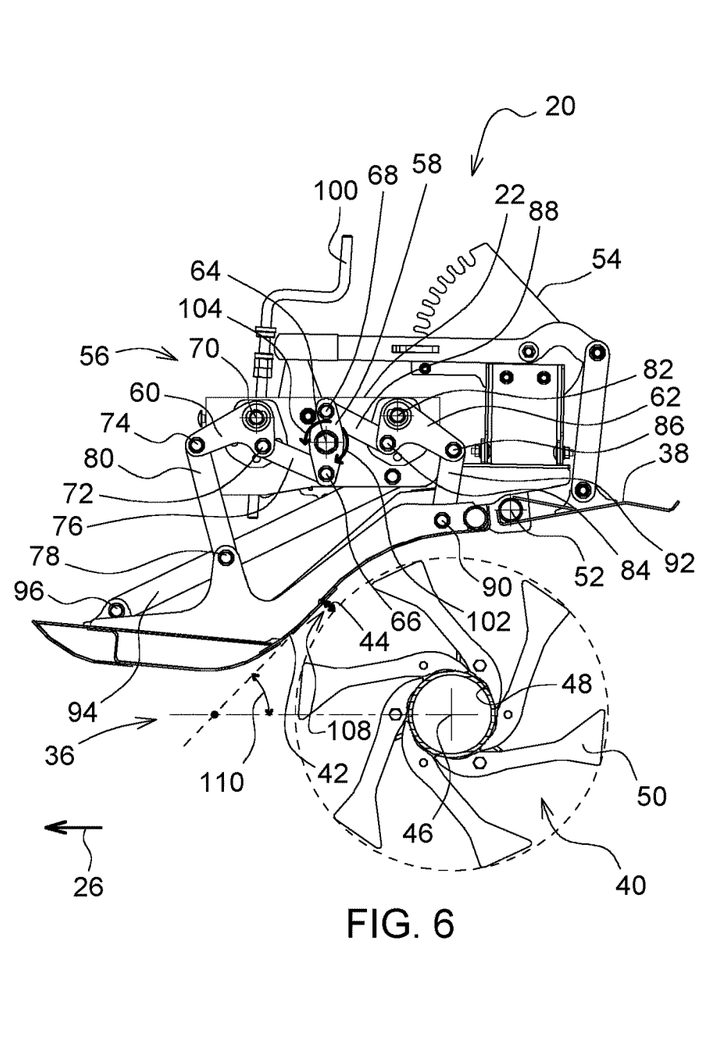
FIG. 6 is a schematic side cross sectional view of the harvesting apparatus showing the hood in a second (lowered) position relative to the crop conditioning element.

Referring to FIGS. 5-6, the hood 42 is disposed above the crop conditioning element 40 to form the gap 44 between the hood 42 and the crop conditioning element 40. The hood 42 is moveably mounted to the frame 22 above the crop conditioning element 40 for movement relative to the crop conditioning element 40. The hood 42 is moveable toward and away from the crop conditioning element 40 for adjusting the gap 44 therebetween. As is understood by those skilled in the art, adjusting the gap 44 changes the amount of crop conditioning and/or the volume of cut crop material that may be processed. For example, increasing the gap 44 distance for a given volume of cut crop material decreases the friction between hood 42 and the crop conditioning element 40, which decreases the amount of crop conditioning. In contrast, decreasing the gap 44 distance for a given volume of cut crop material increases the friction between the hood 42 and the crop conditioning element 40, which increases the amount of crop conditioning. The gap 44 distance may further be adjusted to maintain a given amount of crop conditioning when the volume of cut material passing through the crop conditioning system 36 changes. For example, a higher volume of cut crop material may require that the gap 44 distance be increased to maintain a desired amount of crop conditioning, whereas as lower volume of cut crop material may require that the gap 44 distance be decreased to maintain a desired amount of crop conditioning.

The swathboard 38 is attached to and moveable with the hood 42. The swathboard 38 may be attached to the hood 42 such that the swathboard 38 maintains an operating position relative to the hood 42 during movement with the hood 42 toward and away from the crop conditioning element 40. In the exemplary embodiment shown in the Figures and described herein, the swathboard 38 is rotatably attached to the hood 42 for movement about a swathboard axis 52, between a plurality of operating positions relative to the hood 42. The swathboard 38 is adjustable between the plurality of operating positions, relative to the hood 42, based on how the conditioned crop material is to be discharged rearwardly form the harvesting apparatus 20. For example, the swathboard 38 may be adjusted such that the conditioned crop material is discharged laterally rearwardly in a direction opposite the direction of travel of the harvesting apparatus 20. In another example, the swathboard 38 may be adjusted such that the conditioned crop material is discharged rearwardly and downwardly toward the ground surface. The swathboard 38 may further be adjusted to discharge the conditioned crop material based on a desired width and/or depth of the windrow or swath.

As best shown in FIG. 2, the crop conditioning system 36 includes an adjustment mechanism 54 attached to and moveable with the hood 42. The adjustment mechanism 54 is coupled to the swathboard 38, and is operable to rotate the swathboard 38 relative to the hood 42 and about the swathboard axis 52, between each of the plurality of operating positions. Because the adjustment mechanism 54 is attached to and moves with the hood 42, instead of the frame 22, the position of the swathboard 38 relative to the hood 42 remains constant as the hood 42 moves relative to the crop conditioning element 40.

The harvesting apparatus 20 further includes an actuating system 56 moveably connecting the hood 42 to the frame 22 and configured for moving the hood 42. The actuating system 56 is controllable to move the hood 42 toward and away from the crop conditioning element 40. The hood 42 is shown in a fully raised, first position in FIG. 5. The hood 42 is shown in a fully lowered, second position in FIG. 6. It should be appreciated that the hood 42 may be positioned in an infinite number of positions between the first position and the second position shown in the Figures.

In the exemplary embodiment shown in the Figures and described herein, the actuating system 56 includes a multiple linkage system for moving the hood 42. Referring to FIGS. 5-6, the actuating system 56 includes a driven lever arm 58, a first pivot assembly 60, and a second pivot assembly 62. The driven lever arm 58 is rotatably attached to the frame 22. As noted above, the frame 22 may include multiple different components including one or more brackets. As such, it should be appreciated that the driven lever arm 58 may be attached to a bracket, which is in turn attached to the frame 22. The driven lever arm 58 is rotatably attached to the frame 22 for rotation about a lever rotation axis 64. The lever rotation axis 64 extends transverse or perpendicular to the central longitudinal axis 24 of the frame 22. The driven lever arm 58 includes a first lever connection 66 and a second lever connection 68 positioned opposite each other across the lever rotation axis 64. In one example implementation, shown in the figures and described herein, the first lever connection 66 and the second lever connection 68 are arranged approximately one hundred eighty degrees (180°) apart from each other angularly about the lever rotation axis 64. Additionally, in the example implementation shown in the figures and described herein, the first lever connection 66 and the second lever connection 68 are positioned equidistance from the lever rotation axis 64.

The first pivot assembly 60 is rotatably attached to the frame 22 for rotation about a first pivot axis 70. The first pivot axis 70 extends transverse or perpendicular to the central longitudinal axis 24 of the frame 22 and is parallel with the lever rotation axis 64. As noted above, the frame 22 may include multiple different components including one or more brackets. As such, it should be appreciated that the first pivot assembly 60 may be attached to a bracket, which is in turn attached to the frame 22. The first pivot assembly 60 includes a first pivot connection 72 and a second pivot connection 74. The first pivot connection 72 is coupled to the first lever connection 66 of the driven lever arm 58. More particularly, a first link 76 interconnects the first lever connection 66 of the driven lever arm 58 and the first pivot connection 72 of the first pivot assembly 60. The first link 76 is rotatably attached to both the driven lever arm 58 and the first pivot assembly 60 at the first lever connection 66 and the first pivot connection 72 respectively. The second pivot connection 74 is coupled to a first lift connection 78 of the hood 42. More particularly, a third link 80 interconnects the second pivot connection 74 of the first pivot assembly 60 and the first lift connection 78 of the hood 42. The third link 80 is rotatably attached to both the first pivot assembly 60 and the hood 42 at the second pivot connection 74 and the first lift connection 78 respectively.

The second pivot assembly 62 is rotatably attached to the frame 22 for rotation about a second pivot axis 82. The second pivot axis 82 extends transverse or perpendicular to the central longitudinal axis 24 of the frame 22 and is parallel with the lever rotation axis 64 and the first pivot axis 70. As noted above, the frame 22 may include multiple different components including one or more brackets. As such, it should be appreciated that the second pivot assembly 62 may be attached to a bracket, which is in turn attached to the frame 22. The second pivot assembly 62 includes a third pivot connection 84 and a fourth pivot connection 86. The third pivot connection 84 is coupled to the second lever connection 68 of the driven lever arm 58. More particularly, a second link 88 interconnects the second lever connection 68 of the driven lever arm 58 and the third pivot connection 84 of the second pivot assembly 62. The second link 88 is rotatably attached to both the driven lever arm 58 and the second pivot assembly 62 at the second lever connection 68 and the third pivot connection 84 respectively. The fourth pivot connection 86 is coupled to a second lift connection 90 of the hood 42. More particularly, a fourth link 92 interconnects the fourth pivot connection 86 of the second pivot assembly 62 and the second lift connection 90 of the hood 42. The fourth link 92 is rotatably attached to both the second pivot assembly 62 and the hood 42 at the fourth pivot connection 86 and the second lift connection 90 respectively.

The driven lever arm 58 is positioned between the first pivot assembly 60 and the second pivot assembly 62 along the central longitudinal axis 24 of the frame 22. The first pivot assembly 60 is positioned forward of the driven lever arm 58 along the central longitudinal axis 24 of the frame 22. The driven lever arm 58 is positioned forward of the second pivot assembly 62 along the central longitudinal axis 24 of the frame 22. In the example implementation shown in the figures and described herein, the lever rotation axis 64 is equidistant from the first pivot axis 70 and the second pivot axis 82 along the central longitudinal axis 24 of the frame 22.

As described above, the hood 42 includes the first lift connection 78 and the second lift connection 90. The first lift connection 78 is positioned forward of the second lift connection 90 along the central longitudinal axis 24 of the frame 22 relative to the direction of forward travel 26. The first pivot assembly 60 is positioned forward of the second pivot assembly 62 along the central longitudinal axis 24 of the frame 22 relative to the direction of forward travel 26. The third link 80, which connects the first pivot assembly 60 and the first lift connection 78, extends in a generally vertical orientation that is angled slightly forward. The fourth link 92, which connects the second pivot assembly 62 and the second lift connection 90, extends in a generally vertical orientation that is angled slightly rearward. As such, the third link 80 and the fourth link 92 do not cross and are not directly connected or attached to each other.

A bar 94 extends between and interconnects the hood 42 and the frame 22. The bar 94 is attached to the hood 42 at a first bar mount 96 and is attached to the frame 22 at a second bar mount 98. The bar 94 is pivotably attached to the hood 42 and the frame 22 at the first bar mount 96 and the second bar mount 98 respectively. The bar 94 is a rigid structure that is positioned relative to the other components of the actuating system 56 to limit forward and/or rearward movement of the hood 42 relative to the frame 22. In the example implementation shown in the Figures and described herein, the first bar mount 96 is positioned forward of the second bar mount 98 along the central longitudinal axis 24 of the frame 22. Additionally, the first bar mount 96 is positioned forward of the first lift connection 78 along the central longitudinal axis 24 of the frame 22 relative to the direction of forward travel 26. The second bar mount 98 may be positioned between the first lift connection 78 and the second lift connection 90 along the central longitudinal axis 24 of the frame 22. In the example implementation shown in the Figures, the second bar mount 98 is positioned vertically beneath the second pivot axis 82.

An actuator 100 is coupled to the driven lever arm 58. The actuator 100 is operable to rotate the driven lever arm 58 in at least one of a first rotational direction 102 or a second rotational direction 104. The second rotational direction 104 is opposite to the first rotational direction 102. As used herein, the first rotational direction 102 may be considered a clockwise direction as viewed on the page of the Figures, whereas the second rotational direction 104 may be considered a counterclockwise direction as viewed on the page of the Figures. However, it should be appreciated that the first rotational direction 102 and the second rotational direction 104 may be defined differently than the example implementation described herein.

The actuator 100 may include, but is not limited to, an electric motor, a hydraulic motor, one or more hydraulic cylinders, or some other device or system capable of rotating the driven lever arm 58 about the lever rotation axis 64. In the example implementation shown in the Figures and described herein, the actuator 100 includes a manually operated hand crank that is connected to a drive shaft 106. Rotation of the hand crank rotates the drive shaft 106 about the lever rotation axis 64. The drive shaft 106 interconnects the actuator 100, e.g., the hand crank, and the driven lever arm 58 and is operable to transmit torque between the actuator 100 and the driven lever arm 58. While the example implementation includes the hand crank coupled to the drive shaft 106, it should be appreciated that other implementations may include different implementations of the actuator 100 coupled to the hand crank, such as but not limited to, an electric motor, a hydraulic motor, one or more hydraulic cylinders, etc.

The first lever connection 66 and the first pivot connection 72 are positioned relative to the lever rotation axis 64 and the first pivot axis 70 respectively such that rotation of the driven lever arm 58 in the first rotational direction 102 rotates the first pivot assembly 60 in the first rotational direction 102, and rotation of the driven lever arm 58 in the second rotational direction 104 rotates the first pivot assembly 60 in the second rotational direction 104. In contrast, the second lever connection 68 and the third pivot connection 84 are positioned relative to the lever rotation axis 64 and the second pivot axis 82 respectively such that rotation of the driven lever arm 58 in the first rotational direction 102 rotates the second pivot assembly 62 in the second rotational direction 104, and rotation of the driven lever arm 58 in the second rotational direction 104 rotates the second pivot assembly 62 in the first rotational direction 102.

The second pivot connection 74 is positioned relative to the first pivot axis 70 and the first pivot connection 72 to travel in a substantially upward vertical direction in response to rotation of the first pivot assembly 60 in the first rotational direction 102, and travel in a substantially downward vertical direction in response to rotation of the first pivot assembly 60 in the second rotational direction 104. In contrast, the fourth pivot connection 86 is positioned relative to the second pivot axis 82 and the third pivot connection 84 to travel in the substantially upward vertical direction in response to rotation of the second pivot assembly 62 in the second rotational direction 104, and travel in the substantially downward vertical direction in response to rotation of the second pivot assembly 62 in the first rotational direction 102.

Rotation of the first pivot assembly 60 about the first pivot axis 70 in the first rotational direction 102 and rotation of the second pivot assembly 62 about the second pivot axis 82 in the second rotational direction 104 moves the hood 42 away from the crop conditioning element 40. Rotation of the first pivot assembly 60 about the first pivot axis 70 in the second rotational direction 104 and rotation of the second pivot assembly 62 about the second pivot axis 82 in the first rotational direction 102 moves the hood 42 toward the crop condition element. The positioning of the components of the actuating system 56 enable the hood 42 to move relative to the crop conditioning element 40 while substantially maintaining the same orientation of the hood 42 relative to the crop conditioning element 40. In other words, the hood 42 may move generally vertically up or down without significantly swinging or rotating. This enables the hood 42 to maintain its positional orientation relative to the crop conditioning element 40. By maintaining the positional orientation of the hood 42 relative to the crop condition element, the location of the pinch point 108 between the hood 42 and the crop conditioning element 40, as well as the entrance angle 110 into the gap 44 remain substantially constant, thereby providing consistent conditioning of the crop material as the gap 44 is adjusted.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A harvesting apparatus for an agricultural machine, the harvesting apparatus comprising:
   a frame;
   a cutting mechanism coupled to the frame and operable to cut crop material;
   a crop conditioning element coupled to the frame;
   a hood moveable relative to the crop conditioning element, the hood including a first lift connection and a second lift connection;
   an actuating system moveably connecting the hood to the frame, the actuating system including:
   a driven lever arm rotatably attached to the frame for rotation about a lever rotation axis, the driven lever arm including a first lever connection and a second lever connection positioned opposite each other across the lever rotation axis;
   a first pivot assembly rotatably attached to the frame at a first pivot axis for rotation about the first pivot axis, the first pivot assembly including a first pivot connection offset from the first pivot axis and coupled to the first lever connection of the driven lever arm, and a second pivot connection offset from the first pivot axis and coupled to the first lift connection of the hood;
   a second pivot assembly rotatably attached to the frame at a second pivot axis for rotation about the second pivot axis, the second pivot assembly including a third pivot connection offset from the second pivot axis and coupled to the second lever connection of the driven lever arm, and a fourth pivot connection offset from the second pivot axis and coupled to the second lift connection of the hood; and wherein the first pivot axis and the second pivot axis are spaced apart from each other along a central longitudinal axis of the frame.

2. The harvesting apparatus set forth in claim 1, further comprising a first link interconnecting the first lever connection of the driven lever arm and the first pivot connection of the first pivot assembly.

3. The harvesting apparatus set forth in claim 1, further comprising a second link interconnecting the second lever connection of the driven lever arm and the third pivot connection of the second pivot assembly.

4. The harvesting apparatus set forth in claim 1, further comprising a third link interconnecting the second pivot connection of the first pivot assembly and the first lift connection of the hood.

5. The harvesting apparatus set forth in claim 1, further comprising a fourth link interconnecting the fourth pivot connection of the second pivot assembly and the second lift connection of the hood.

6. The harvesting apparatus set forth in claim 1, wherein the first lift connection is positioned along the central longitudinal axis of the frame forward of the second lift connection relative to a direction of forward travel.

7. The harvesting apparatus set forth in claim 6, wherein the first pivot assembly is positioned along the central longitudinal axis of the frame forward of the second pivot assembly relative to the direction of forward travel.

8. The harvesting apparatus set forth in claim 1, wherein the first lever connection and the first pivot connection are positioned relative to the lever rotation axis and the first pivot axis respectively such that rotation of the driven lever arm in a first rotational direction rotates the first pivot assembly in the first rotational direction, and rotation of the driven lever arm in a second rotational direction rotates the first pivot assembly in the second rotational direction.

9. The harvesting apparatus set forth in claim 8, wherein the second lever connection and the third pivot connection are positioned relative to the lever rotation axis and the second pivot axis respectively such that rotation of the driven lever arm in the first rotational direction rotates the second pivot assembly in the second rotational direction, and rotation of the driven lever arm in the second rotational direction rotates the second pivot assembly in the first rotational direction.

10. The harvesting apparatus set forth in claim 1, wherein rotation of the first pivot assembly about the first pivot axis in a first rotational direction and rotation of the second pivot assembly about the second pivot axis in a second rotational direction moves the hood away from the crop conditioning element, and wherein rotation of the first pivot assembly about the first pivot axis in the second rotational direction and rotation of the second pivot assembly about the second pivot axis in the first rotational direction moves the hood toward the crop condition element.

11. The harvesting apparatus set forth in claim 1, further comprising a bar interconnecting the hood and the frame.

12. The harvesting apparatus set forth in claim 11, wherein the bar is attached to the hood at a first bar mount, and wherein the bar is attached to the frame at a second bar mount.

13. The harvesting apparatus set forth in claim 12, wherein the first bar mount is positioned along the central longitudinal axis of the frame forward of the second bar mount relative to a direction of forward travel.

14. The harvesting apparatus set forth in claim 12, wherein the first bar mount is positioned along the central longitudinal axis of the frame forward of the first lift connection relative to a direction of forward travel.

15. The harvesting apparatus set forth in claim 1, further comprising an actuator coupled to the driven lever arm and operable to rotate the driven lever arm in at least one of a first rotational direction or a second rotational direction.

16. The harvesting apparatus set forth in claim 15, further comprising a drive shaft interconnecting the actuator and the driven lever arm and operable to transmit torque between the actuator and the driven lever arm.

17. The harvesting apparatus set forth in claim 1, wherein the lever rotation axis, the first pivot axis, and the second pivot axis are parallel with each other and extend perpendicular to the central longitudinal axis of the frame.

18. The harvesting apparatus set forth in claim 1, wherein the second pivot connection is positioned relative to the first pivot axis and the first pivot connection to travel in a substantially upward vertical direction in response to rotation of the first pivot assembly in a first rotational direction, and travel in a substantially downward vertical direction in response to rotation of the first pivot assembly in a second rotational direction.

19. The harvesting apparatus set forth in claim 18, wherein the fourth pivot connection is positioned relative to the second pivot axis and the third pivot connection to travel in a substantially upward vertical direction in response to rotation of the second pivot assembly in the second rotational direction, and travel in a substantially downward vertical direction in response to rotation of the second pivot assembly in the first rotational direction.

20. A crop conditioning system for a harvesting apparatus, the crop conditioning system comprising:

a frame;

a crop conditioning element;

a hood moveable toward and away from the crop conditioning element to define a gap therebetween, the hood including a first lift connection and a second lift connection;

a driven lever arm rotatably attached to the frame for rotation about a lever rotation axis, the driven lever arm including a first lever connection and a second lever connection positioned opposite each other across the lever rotation axis;

a first pivot assembly rotatably attached to the frame at a first pivot axis for rotation about the first pivot axis, the first pivot assembly including a first pivot connection offset from the first pivot axis and coupled to the first lever connection of the driven lever arm, and a second pivot connection offset from the first pivot axis and coupled to the first lift connection of the hood;

a second pivot assembly rotatably attached to the frame at a second pivot axis for rotation about the second pivot axis, the second pivot assembly including a third pivot connection offset from the second pivot axis and coupled to the second lever connection of the driven lever arm, and a fourth pivot connection offset from the second pivot axis and coupled to the second lift connection of the hood; and wherein the first pivot axis and the second pivot axis are spaced apart from each other along a central longitudinal axis of the frame.

21. The crop conditioning system set forth in claim 20, further comprising a bar attached to the hood at a first bar mount, and wherein the bar is attached to the frame at a second bar mount.

22. The crop conditioning system set forth in claim 20, further comprising an actuator coupled to the driven lever arm and operable to rotate the driven lever arm in at least one of a first rotational direction or a second rotational direction.

23. The crop conditioning system set forth in claim 20, wherein the first lift connection is positioned along the central longitudinal axis of the frame forward of the second lift connection relative to a direction of forward travel, and wherein the first pivot assembly is positioned along the central longitudinal axis of the frame forward of the second pivot assembly relative to the direction of forward travel.

24. The crop conditioning system set forth in claim 20, wherein the first lever connection and the first pivot connection are positioned relative to the lever rotation axis and the first pivot axis respectively such that rotation of the driven lever arm in a first rotational direction rotates the first pivot assembly in the first rotational direction to move the second pivot connection in a substantially upward vertical direction, and wherein the first lever connection and the first pivot connection are positioned relative to the lever rotation axis and the first pivot axis respectively such that rotation of the driven lever arm in a second rotational direction rotates the first pivot assembly in the second rotational direction to move the second pivot connection in a substantially downward vertical direction.

25. The crop conditioning system set forth in claim 24, wherein the second lever connection and the third pivot connection are positioned relative to the lever rotation axis and the second pivot axis respectively such that rotation of the driven lever arm in the first rotational direction rotates the second pivot assembly in the second rotational direction to move the fourth pivot connection in the substantially upward vertical direction, and wherein the second lever connection and the third pivot connection are positioned relative to the lever rotation axis and the second pivot axis respectively such that rotation of the driven lever arm in the second rotational direction rotates the second pivot assembly in the first rotational direction to move the fourth pivot connection in the substantially downward vertical direction.

* * * * *